United States Patent
Segal

(10) Patent No.: US 6,345,299 B2
(45) Date of Patent: *Feb. 5, 2002

(54) DISTRIBUTED SECURITY SYSTEM FOR A COMMUNICATION NETWORK

(75) Inventor: Edward Robert Segal, White Plains, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/977,768

(22) Filed: Nov. 26, 1997

(51) Int. Cl.[7] .............................................. G06F 15/16
(52) U.S. Cl. .................. 709/229; 709/244; 709/245; 709/246; 713/163; 713/200; 713/201
(58) Field of Search .................. 709/229, 244, 709/203, 202, 213, 217, 245–246; 713/201, 200, 163, 22; 380/21

(56) References Cited

U.S. PATENT DOCUMENTS

| 5,416,842 | A | | 5/1995 | Azia ............................. 380/30 |
| 5,548,646 | A | * | 8/1996 | Aziz et al. ..................... 380/23 |
| 5,623,601 | A | * | 4/1997 | Vu ............................... 713/201 |
| 5,748,736 | A | * | 5/1998 | Mittra .......................... 380/21 |
| 5,828,893 | A | * | 10/1998 | Wied et al. ................... 709/229 |

OTHER PUBLICATIONS

U.S. application No. 08/979,037, Segal, filed Nov. 26, 1997.
U.S. application No. 08/979,863, Segal, filed Nov. 26, 1997.
U.S. application No. 08/978,770, Segal, filed Nov. 26, 1997.

* cited by examiner

Primary Examiner—Glenton B. Burgess
Assistant Examiner—Hien L. Le
(74) Attorney, Agent, or Firm—Casey P. August; Michael J. Buchenhorner; Fleit, Kain, Gibbons, Gutman & Bongini PL

(57) ABSTRACT

In a data communication network, a system for protecting parts of the network. The system comprises a plurality of user nodes linked together within the network. Each user node comprises means for transmitting list indicating to other nodes in the network the identification of allowed senders and receivers; and two or more security nodes within the network; each security node detects transmission and relays each signal only to the recipients specified in the list.

9 Claims, 5 Drawing Sheets

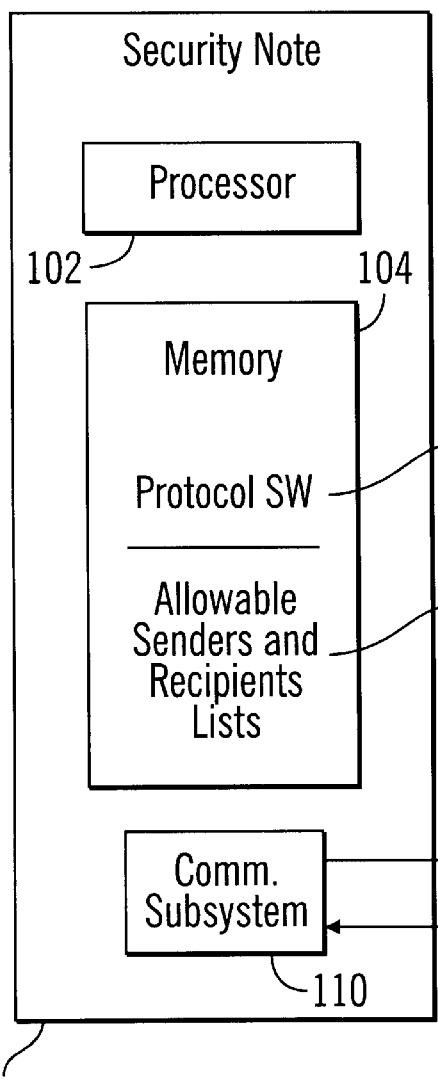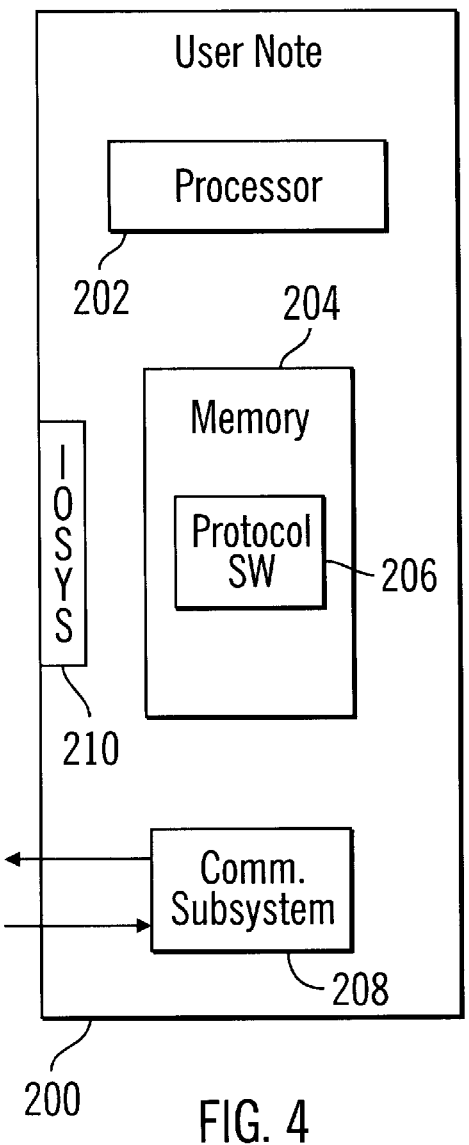

US 6,345,299 B2

DISTRIBUTED SECURITY SYSTEM FOR A COMMUNICATION NETWORK

BACKGROUND OF THE INVENTION

The present invention relates to computers and computer networks and more specifically to a system for providing distributed security and protection in a computer network.

Data communications is of great importance to businesses today. A principal function of computers is to perform communications functions over various computer networks such as local area networks (LANs), wide area networks (WANs) and the Internet. Given the critical nature of much of the information that is transmitted on networks, security has become a great concern to users of such networks. The magnitude of the concern has been increased by the popularity of the Internet with the advent of the World-Wide Web (WWW) which has provided access to thousands of users to a global network of computers and smaller networks all linked together.

Thus, it is becoming increasingly important to provide network access that is reliable and has a higher degree of security. It is also desirable to provide control over the granting of "permission" to utilize the network. It is also important to provide protection against overutilization and unfair utilization of network resources and from the growing number and various types of "Denial of Service" attacks.

One common solution to the security problem in networks has been to provide one large, complex, centralized firewall, that often has to deal with a very large amount of traffic coming through it from all the various paths from many networks. These firewall units are generally large computers having the means to filter information coming into the protected network and to limit access to the protected network. FIG. 1 is a block diagram of a data network 10 having a conventional firewall node 12 at a gateway station. The firewall node 12 protects communications between an unprotected public network 14 (e.g., the Internet) and a private protected network 16. The network 16 can be any of various private networks and it may be comprised of various computers, servers, systems, etc. 18–24. As the size of each network increases so do the demands upon firewall unit 12 which must process all incoming and outgoing data traffic possibly from a vast global network.

Routes in a network are provided to indicate reachability to destinations. They inform where to send to reach destinations. Currently, general networking practice is to send routes to every router in a network, to the entire (inter) corporate net or autonomous system and then at run time try to have built a firewall that is syntactically correct and fast enough to keep undesired traffic out. This is very difficult to begin with and doesn't even prevent all problems such as denial of service attacks and attacks which simply overwhelm the network links and/or the firewall devices and intermediate routers and bridges with more packets than they can filter per unit time, therefore effectively blocking out desired traffic and preventing legitimate users from using the system.

U.S. Pat. No. 5,416,842 relates to a method and apparatus for a key-management scheme for use with internet protocols at site firewalls. It requires encryption and is very processor intensive. It is a centralized approach to the network security problem that is vulnerable to attacks that can overwhelm the unit.

U.S. Pat. No. 5,623,601 relates to an apparatus and method for providing a secure gateway for communication and data exchanges between networks. This discusses a network security system that requires every communication to go through a single gateway that must perform all the processing and is vulnerable to overloading.

Most known network security systems depend on one centralized unit to handle communications for each network. One method seems to briefly recognize this as a significant limitation but does not really suggest a good solution and is a limited method anyway that is still subject to denial of service attacks. Publications IDPR (rfc 1479) and IDRP mention some methods that could increase security.

Most need a device that has enough capacity to handle all traffic going into and out of the network. Most need complex setup protocols and/or security keys. Many require encryption. Most are not distributed and typically require higher level processing for each communication which is processor intensive and time consuming.

SUMMARY OF THE INVENTION

Briefly, in accordance with the invention, the present situation can be improved upon by limiting access to nodes, routes and other networking devices. Routers, firewalls, ingress nodes, and switches could be informed which destination networks and routes should be allowed to which source nodes or networks. A security filtering system enables distributed granting of admission to transmission of signals on to the network, and means for providing distributed admission control, and for providing a distributed firewall. The distributed security system provides a protocol for transmitting to a node location and a list of nodes or networks that are allowed access to the various nodes and services.

BRIEF DESCRIPTION OF THE DRAWING(S)

FIG. 3 shows a security node comprising an information handling system in accordance with the invention.

FIG. 4 shows a user node comprising an information handling system in accordance with the invention.

DESCRIPTION OF THE ILLUSTRATIVE EMBODIMENT(S)

Figure 1:
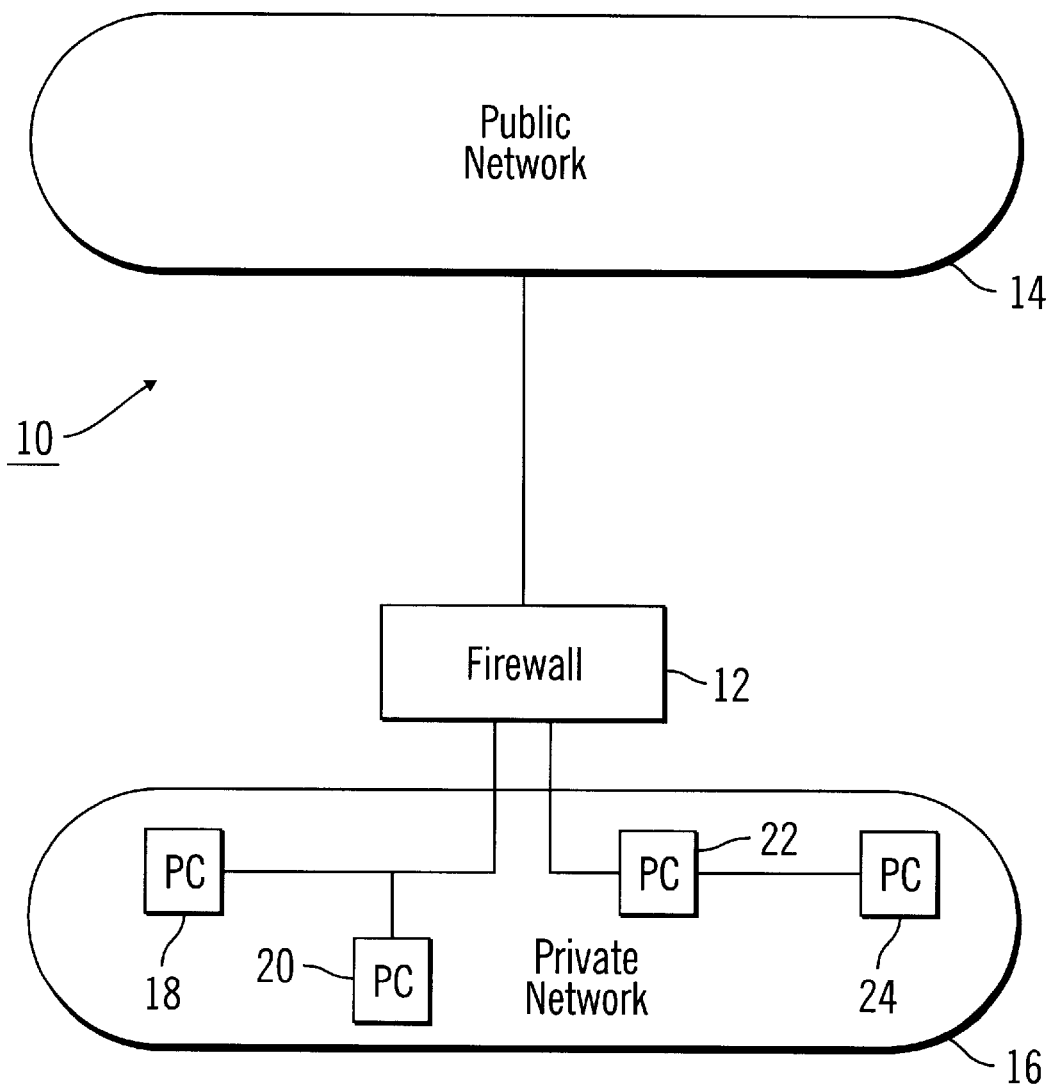
FIG. 1 is a block diagram of a data network having a conventional firewall node.
Figure 2:
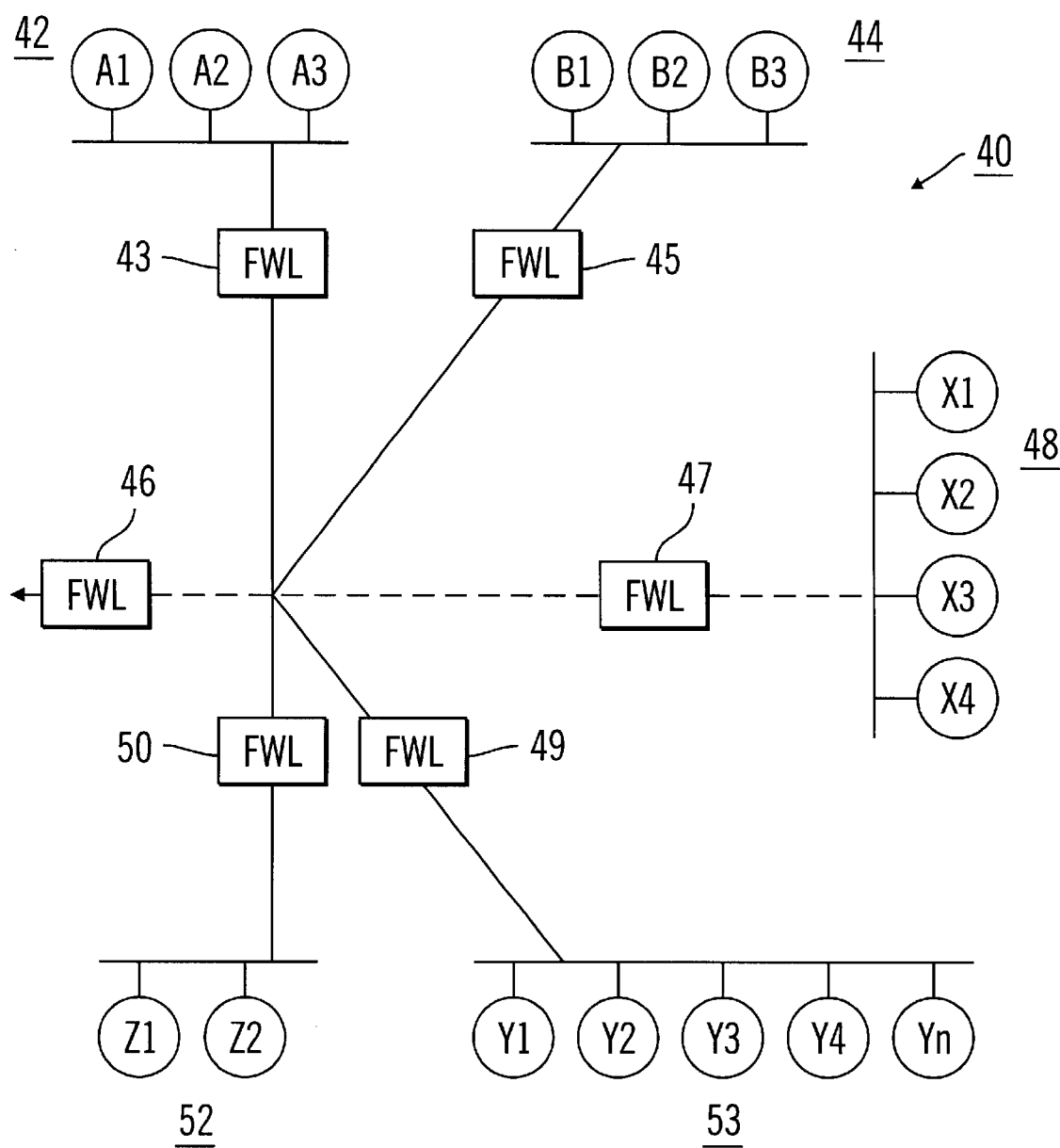
FIG. 2 shows a data network having a distributed security system in accordance with the invention.

FIG. 2 shows a data network 40 having a distributed firewall in accordance with the invention. Network 40 comprises various subnetworks 42, 44, 48, 52, and 53, and firewall units 43, 45, 46, 47, 49, and 50. The network 40 can be any network, such as the Internet, that links networks together. Each subnetwork can include a different protocol. Each firewall unit is a node that provides network access to at least one node in a secure subnetwork. In one possible embodiment, units 43, 45, 46, 47, 49, and 50 are servers operated by Internet Service Providers (ISPs). In accordance with the invention, the network 40 the units 43, 45, 46, 47, 49, and 50 each comprise a shared list setting forth a plurality of listed nodes and a set of access privileges for each listed node. Access privileges are the types of transmissions that a given node listed in the shared list is permitted to make. For example, consider the case where node B1 is a computer or LAN at an accounting firm. The firm may want to restrict the nodes from which it receives or transmits E-mail or certain types of transmissions (i.e. File Transfer Protocol (FTP). In this case, the firm wishes to receive e-mail only form its clients Z1, Y2, and X4. Node B1 would instruct node 45 to provide that the shared list residing at security node 45 would intercept all e-mail and only allow e-mail form nodes Z1, Y2 and X4 but in this distributed system, it is also possible for security node 49 to only allow e-mail from Y2, node 50 prohibits e-mail form Z2 and so forth. Thus, with the cooperation of other nodes, it is virtually impossible to overwhelm node 45 with unpermitted transmissions. The shared list may provide with respect to any listed node that it can only transmit to certain other listed nodes and, with respect to those nodes it can transmit to, restrictions applicable to such transmissions.

Nodes in the Internet are commonly populated by information handling units having commercial content that the operators of such nodes want to advertise. Accordingly, it is common for such nodes to transmit routes to other nodes, indicating how to reach the transmitting node. Such advertising reaches not only those targeted by the node operator but anyone else in the network 40. This presents security problems because the widespread knowledge of the transmitting node's location provides an opportunity for users of other nodes to transmit undesirable signals or transmissions to the transmitting node. In accordance with the invention, a protocol for the network 40 would provide for lists sent by each node indicating which other nodes are permitted to receive from, and transmit to it, and what types of access they are allowed. That information is detected by each firewall unit which limits transmissions the routes only to their intended destinations. The firewall units also have the capability to accept signals from the network for only certain defined purposes. The list of intended recipients can have any desired granularity. The situation can be improved upon by providing a set of firewall-type commands that include lists of which nodes, sources, networks are allowed to use certain destinations. These commands can be utilized by filtering devices and/or security devices such as firewalls, ingress nodes, switches, which would be informed which destination nodes, addresses, ports, are permitted to which source nodes or networks. These filtering devices and/or security devices may be separate stand-alone components or their capability may be integrated into other, possibly already existing, devices.

Referring to FIG. 3, there is shown a network node that comprises an information handling unit comprising an information handling unit (e.g., a computer) comprising a processor unit 102, a memory subsystem (including RAM, ROM, and/or hard disk storage) 104, and a communication subsystem 110 which can be any of several well-known communication adapters for communicating with other nodes in the network. The memory 104 includes software such as network protocol program 106, and an allowable sender and recipient list 108 for transmissions. This list can be maintained in the unit 100 or received from nodes on the network.

Referring to FIG. 4, there is shown a user node that comprises an information handling unit 200 comprising an information handling unit (e.g., a computer) comprising a processor unit 202, a memory subsystem (including RAM, ROM, and/or hard disk storage) 204, and a communication subsystem 208 which can be any of several well-known communication adapters and a modem for communicating with other nodes in the network. The memory 204 includes software such a network protocol program 206, that includes the functionality shown in FIG. 4.

Figure 5:
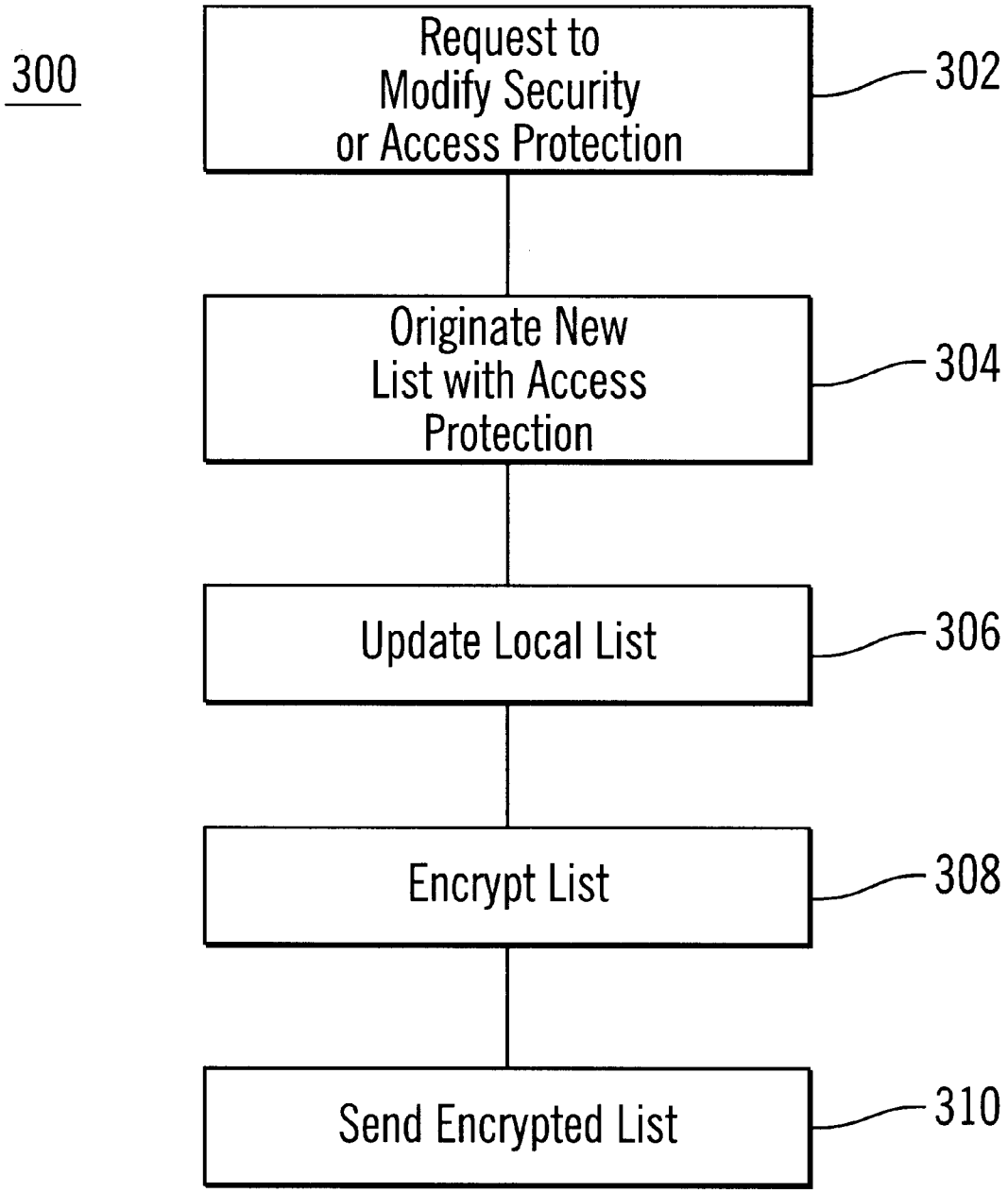
FIG. 5 is a flow chart of an originating node modifying security protection in accordance with the invention.

FIG. 5 is a flow chart illustrating a method 300 in accordance with the invention. The method 300 may be performed in any node in the network authorized to modify the list. In step 302, a request is made at a node to modify security or access protection. In step 304, the node originates a new list with access protection. Step 306 updates the local list. Step 308 encrypts the list and step 310 transmits the encrypted list to other security devices on the network.

Figure 6:
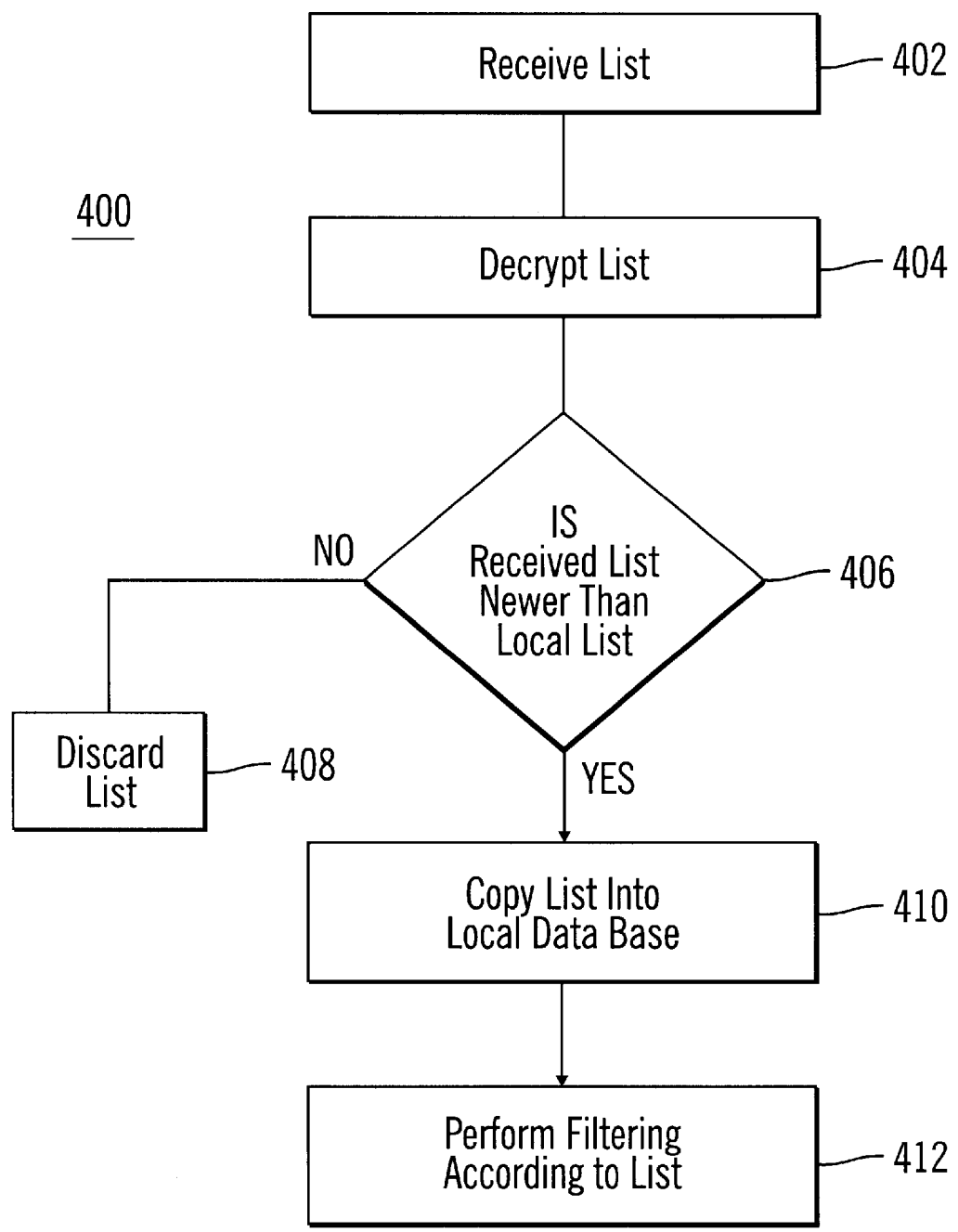
FIG. 6 is a flow chart of a receiving node modifying security protection in accordance with the invention.

FIG. 6 is a flow chart illustrating a method 400 in accordance with the invention. In step 402, a node comprising a security device receives the encrypted list. In step 404, the receiving security device decrypts the received list. A decision 406 is then made to determine whether the received list is newer than the local list. If it is not, the received list is discarded in step 408. If the received list is newer than the local list, the received list is copied into the local database (i.e, storage) in step 410. Then in step 412, the security unit filters received transmissions in accordance with the most recent local list.

The system presented allows for inter-firewall cooperation and sharing the load between various filtering and security devices. This provides for a distributed firewall capability and also permits (multiple) smaller firewalls and/or admission control points. It also allows sharing the load. Information on which networks and nodes should be granted access could be transmitted to the distributed elements.

While the invention has been illustrated in connection with a preferred embodiment, it will be understood that many variations will occur to those of ordinary skill in the art, and that the scope of the invention is defined only by the claims appended hereto and equivalents.

What is claimed is:

1. In a data communication network comprising a plurality of user nodes linked together within the network, the network including at least first and second firewall-protected subnetworks, a system for protecting the firewall-protected subnetworks of the network, the system comprising:

at least first and second firewall security nodes, the first firewall security node coupling the user nodes in the first firewall-protected subnetwork to the user nodes in other firewall-protected subnetworks of the network, and the second firewall security node coupling the user nodes in the second firewall-protected subnetwork to the user nodes in other firewall-protected subnetworks of the network, wherein each of the firewall security nodes includes a shared list setting forth a plurality of listed nodes and a set of access privileges for each listed node, the shared list being an identical list shared by the first and second firewall security nodes and being used to filter transmissions in accordance with the access privileges set forth in the shared list, each of the firewall security nodes uses the shared list to filter transmissions to and from the other firewall-protected subnetworks of the network in accordance with the access privileges set forth in the shared list, and at least one user node in the second firewall-protected subnetwork instructs the second firewall security node to provide that the shared list residing at the second firewall security node filter all transmissions to the one user node and permit only a set of allowable types of transmissions specified by the one user node.

2. The data communication network of claim 1 wherein each shared list comprises a set of allowed network addresses for each of the listed nodes and wherein each of the listed nodes is permitted to transmit to each of its associated allowed addresses.

3. The system of claim 1, wherein whenever one of the firewall security nodes alters the shared list, the one firewall security node sends a list directly to all of the other firewall security nodes, the list indicating which nodes are permitted to receive from and transmit to the user nodes of the firewall-protected subnetwork of that firewall security node, and any of the firewall security nodes can alter the shared list.

4. The system of claim 1, wherein each firewall security node sends a list directly to all of the other firewall security nodes, the list indicating which types of access are allowed to the user nodes of the firewall-protected subnetwork protected by that firewall security node.

5. In a communication network comprising a plurality of firewall-protected subnetworks of nodes and a plurality of firewall security units, each firewall security unit for coupling at least one node in one of the firewall-protected subnetworks with the nodes in other firewall-protected subnetworks of the communication network, each firewall security unit comprising:

means for receiving incoming signals from nodes in other firewall-protected subnetworks of the network;

storage means for storing the incoming signals;

a shared list for determining to which nodes the incoming signal is permitted to be transmitted based on the node that sent the signal; and means for relaying the signal to one or more permitted recipients specified in the shared list, wherein the shared list is an identical list shared by all of the firewall security units in all of the firewall-protected subnetworks, the shared list is used by each firewall security unit to filter transmissions to and from the other firewall-protected subnetworks of the network in accordance with access privileges set forth in the shared list so as to protect the firewall-protected subnetworks of the network, and at least one node in one of the firewall-protected subnetworks instructs the firewall security unit that couples the one node with the nodes in the other firewall-protected subnetworks to provide that the shared list residing at the firewall security unit filter all transmissions to the one node and permit only a set of allowable types of transmissions specified by the one node.

6. In the communication network of claim 5, each firewall security unit further comprising means for directly sending a list to all of the other firewall security units, the list indicating which nodes are permitted to receive from and transmit to the nodes of the firewall-protected subnetwork protected by that firewall security unit.

7. In the communication network of claim 5, each firewall security unit further comprising means for directly sending a list to all of the other firewall security units, the list indicating which types of access are allowed to the nodes of the firewall-protected subnetwork protected by that firewall security unit.

8. In a data communication network comprising a plurality of firewall-protected subnetworks of user nodes linked together within the network and a plurality of firewall security units each for coupling at least one user node in one of the firewall-protected subnetworks with the user nodes in other firewall-protected subnetworks of the data communication network, a system for protecting the firewall-protected subnetworks of the network, the system including a computer program product comprising:

a computer readable information storage medium comprising a shared list setting forth a plurality of listed nodes and a set of access privileges for each listed node, wherein the shared list is an identical list shared by all of the firewall security units of all of the firewall-protected subnetworks, and the shared list is used by each of the firewall security units to filter transmissions to and from the other firewall-protected subnetworks in accordance with the access privileges set forth in the shared list, and at least one user node in one of the firewall-protected subnetworks instructs the firewall security unit that couples the one user node with the user nodes in the other firewall-protected subnetworks to provide that the shared list residing at the firewall security unit filter all transmissions to the one user node and permit only a set of allowable types of transmissions specified by the one user node.

9. In a network comprising a plurality of firewall-protected subnetworks of nodes and a plurality of firewall security nodes, each of the firewall security nodes controlling access to one of the firewall-protected subnetworks of the network, a method for distributing a list comprising security permissions to a set of firewall security nodes within the network, each of said firewall security nodes including local storage, the method comprising the steps of:

having at least one node in one of the firewall-protected subnetworks instruct the firewall security node that controls access to the one node to provide that the list of security permissions residing at the firewall security node filter all transmissions to the one node and permit only a set of allowable types of transmissions specified by the one node;

creating a new list of security permissions;

distributing said new list of security permissions to said set of firewall security nodes within said network;

receiving said new list of security permissions;

updating said local storage on said set of firewall security nodes; and filtering transmissions to and from the other firewall-protected subnetworks of the network and selectively permitting transmissions in accordance with the access privileges set forth in said list of security permissions updated in said local storage so as to protect the firewall-protected subnetworks of the network.

* * * * *